United States Patent
Ray et al.

(10) Patent No.: US 11,556,612 B2
(45) Date of Patent: Jan. 17, 2023

(54) PREDICTING MATERIAL DISTRIBUTION IN A HYDRAULIC FRACTURING TREATMENT STAGE

(71) Applicant: Halliburton Energy Services, Inc., Houston, TX (US)

(72) Inventors: Baidurja Ray, Jersey Village, TX (US); Tirumani N. Swaminathan, Houston, TX (US); Seyed Omid Razavi, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 446 days.

(21) Appl. No.: 16/564,870

(22) Filed: Sep. 9, 2019

(65) Prior Publication Data
US 2021/0073314 A1    Mar. 11, 2021

(51) Int. Cl.
*G06F 111/10* (2020.01)
*G06F 17/11* (2006.01)
(Continued)

(52) U.S. Cl.
CPC .............. *G06F 17/11* (2013.01); *E21B 47/06* (2013.01); *E21B 47/135* (2020.05); *E21B 2200/20* (2020.05); *G06F 2111/10* (2020.01)

(58) Field of Classification Search
CPC ...... G06F 17/11; G06F 30/00; G06F 2111/10; E21B 47/135; E21B 47/06; E21B 2200/10; E21B 2200/20
See application file for complete search history.

(56) References Cited

U.S. PATENT DOCUMENTS 7,516,793 B2    4/2009  Dykstra
8,412,500 B2 *  4/2013  Weng ................. G06G 7/50
                                                   703/10
(Continued)

FOREIGN PATENT DOCUMENTS

WO      2018048415 A1     3/2018
WO   WO 2018084871 A1 *   5/2018
(Continued)

OTHER PUBLICATIONS

Huang, J., Safari, R. and Fragachan, F.E., Oct. 2018. Applications of self-degradable particulate diverters in wellbore stimulations: hydraulic fracturing and matrix acidizing case studies. In SPE International Hydraulic Fracturing Technology Conference and Exhibition. OnePetro. (Year: 2018).*

(Continued)

*Primary Examiner* — Chuen-Meei Gan
(74) *Attorney, Agent, or Firm* — John Wustenberg; Parker Justiss, P.C.

(57) ABSTRACT

The disclosure presents a technique for determining how downhole material will be distributed among two or more active perforation clusters in a hydraulic fracturing well system. The determination can be conducted during the execution of a treatment stage allowing modifications prior to completion of the treatment stage. The technique utilizes a three-step process where a first step can determine a predictive model of the wellbore, such as subterranean formation properties, wellbore properties, and target goal of the treatment stage. A second step can calibrate for unknown parameters, such as downhole HF fluid pressure at the active perforation clusters and downhole HF fluid flow rate at the perforation clusters. A third step can predict how downhole material will be distributed to the active perforation clusters and fracture clusters. The prediction result can be utilized to (Continued)

modify a pumping plan of the treatment stage to better achieve the targeted goal.

20 Claims, 8 Drawing Sheets

(51) Int. Cl.
*E21B 47/06* (2012.01)
*E21B 47/135* (2012.01)

(56) References Cited

U.S. PATENT DOCUMENTS

| | | | |
|---|---|---|---|
| 10,465,501 B2 * | 11/2019 | Friehauf | G01H 9/004 |
| 2008/0183451 A1 | 7/2008 | Weng et al. | |
| 2014/0222405 A1 * | 8/2014 | Lecerf | E21B 43/00 |
| | | | 703/10 |
| 2017/0364795 A1 * | 12/2017 | Anderson | G06N 20/10 |
| 2018/0016895 A1 * | 1/2018 | Weng | E21B 41/00 |
| 2018/0238169 A1 | 8/2018 | Sun et al. | |
| 2018/0306016 A1 * | 10/2018 | Safonov | C09K 8/60 |
| 2019/0128112 A1 * | 5/2019 | Spicer | E21B 47/06 |
| 2020/0182051 A1 * | 6/2020 | Filippov | E21B 47/00 |

FOREIGN PATENT DOCUMENTS

| | | | | |
|---|---|---|---|---|
| WO | 2018143918 A1 | 8/2018 | | |
| WO | 2018160171 A1 | 9/2018 | | |
| WO | WO-2018160171 A1 * | 9/2018 | | E21B 43/255 |

OTHER PUBLICATIONS

Wutherich K, Srinivasan S, Ramsey L, Katon WM, Downie R. Engineered diversion: using well heterogeneity as an advantage to designing stage specific diverter strategies. InSPE Canada Unconventional Resources Conference Mar. 13, 2018. OnePetro. (Year: 2018).*

Jones, et al.; "SciPy: Open Source Scientific Tools for Python"; https://www.scipy.org/; 2001; 4 pgs.

* cited by examiner

PREDICTING MATERIAL DISTRIBUTION IN A HYDRAULIC FRACTURING TREATMENT STAGE

TECHNICAL FIELD

This application is directed, in general, to determining a hydraulic fracturing treatment stage plan and, more specifically, to determining material distribution due to a pumping plan of the treatment stage.

BACKGROUND

In hydraulic fracturing well systems, treatment stages are used to implement part of a well site operation plan. The treatment stage can pump various types of downhole materials, such as fluids, solids, proppants, chemicals, diverter material, and other material into a wellbore of the well site to aid in the hydraulic fracturing operations. The effectiveness of the material pumped into the wellbore can vary due to the subterranean formation properties and the material properties, such as the absorption capabilities of surrounding formation, the type and chemical properties of the materials used. One factor of the material properties that ties into its effectiveness is the distribution of the downhole material among the active perforation clusters. Knowing how the downhole material will be distributed and how that relates to achieving the goal of the treatment stage would be beneficial.

SUMMARY

In one aspect, a method to determine a distribution of a downhole material for a treatment stage of a HF well site is disclosed. In one embodiment, the method, includes: (1) determining a predictive model of the well site, (2) calibrating values of unknown parameters of the predictive model, and (3) predicting a distribution result of the downhole material for active perforation clusters of the well site.

In another aspect, a system to determine a distribution of a downhole material for a well site is disclosed. In one embodiment, the system, includes: (1) a fluid sensor, located at the well site, and operable to collect one or more of a surface HF fluid pressure parameter, a surface proppant concentration parameter, a downhole HF fluid pressure parameter, a surface HF fluid flow rate parameter, and a downhole HF fluid flow rate parameter, wherein the well site is a HF well site, and (2) a downhole material predictor, operable to determine a predictive model using received predictive model parameters, modify the predictive model using parameters received from the fluid sensor, calibrate values of unknown parameters of the predictive model using a calibration process on a part or whole of the current or previous pumping stage, and predict a distribution result of the downhole material for one or more active perforation clusters of the well site.

In a third aspect, a computer program product having a series of operating instructions stored on a non-transitory computer-readable medium that directs a data processing apparatus when executed thereby to perform operations to determine a distribution of a downhole material for a treatment stage of a HF well site is disclosed. In one embodiment the computer program product operations includes: (1) determining a predictive model of the well site, (2) calibrating values of unknown parameters of the predictive model, and (3) predicting a distribution result of the downhole material for active perforation clusters of the well site.

BRIEF DESCRIPTION

Reference is now made to the following descriptions taken in conjunction with the accompanying drawings, in which.

DETAILED DESCRIPTION

In hydraulic fracturing (HF) well systems, a downhole material distribution process is often utilized in developing the HF well sites. The downhole material, i.e., HF fluid, with or without added components, can be one or more of various types of materials distributed within a wellbore of the well site, for example, slurrys, oil-based fluids, water-based fluids (such as various types of brine), wellbore muds, gaseous fluids (such as air or other gases, by itself or combined with water, polymers, and other additives), proppants, chemicals, solids (such as low gravity and high gravity solids), diverter material, carrier fluid, and a combination thereof. The downhole material can be used to aid fracturing the subterranean formation, extracting hydrocarbons from the wellbore, and other well site operations.

To develop a HF well site, a target downhole material distribution can be set as the target for a HF treatment stage. The distribution can include an amount of one or more of the types of downhole material distributed to one or more targeted perforation clusters and to one or more fracture clusters. An active perforation cluster is a perforation cluster, located along a fluid pipe inserted into a wellbore that is being utilized during a treatment stage. Certain perforation clusters may be deactivated or otherwise unused, such as closing a valve, being clogged, or otherwise not being used by the treatment stage plan. Proximate each active perforation cluster can be zero or more fractures of the subterranean formation, collectively identified as a fracture cluster.

A pumping plan for pumping, e.g., distributing, the downhole material can utilize a predictive model of the wellbore environment. The pumping plan can be implemented in the current treatment stage or a future treatment stage and can include a HF fluid pressure, a HF fluid flow rate, a concentration of proppants, a concentration of chemicals, a concentration of solids, and a diverter schedule. The diverter schedule can include a profile of the diverter material, such as the type of diverter material, the drop rate, the seating profile, the concentration, the drop timing, and other diverter material parameters.

The predictive model can be determined using various factors, for example, the subterranean formation (such as mineralogical properties and the number and size of fracture clusters), wellbore properties (such as wellbore temperature, wellbore pressure, and the number of active perforation clusters), downhole material properties (such as for fluids, proppants, chemicals, solids, and diverter materials), and the completion properties targeted by the treatment stage. The predictive model can describe the HF fluid pressure at each of the active perforation clusters included in the predictive model as a function of time and a fracture cluster HF fluid flow rate. In one aspect, the predictive model can be a physical model. The physical model can be represented as a resistor-type physical model. The resistor-type model calculates the HF fluid pressure relationship as the HF fluid pressure at a surface location or a downhole reference location, and then reduced by the pressure loss as the HF fluid passes through the active perforation cluster, reduced by the pressure loss due to tortuosity of the HF fluid flow path, and reduced by the pressure loss due to the friction in the fracture cluster.

This disclosure utilizes the pumping plan, the predictive model, and applies a calibration for values of unknown parameters of the predictive model to derive a prediction, e.g., result, of the downhole material distribution. The processes described in this disclosure can be executed one or more times, e.g., repeated, during the treatment stage, such as on demand by a well site engineer or automatically as determined by the treatment stage plan. In some aspects, the prediction can be generated in real-time or near real-time, for example, every ten minutes throughout the treatment stage. The parameters used for the predictive model are typically collected for a variety of purposes in addition to being used by the prediction process. This reuse of parameters can minimize costs where the remaining costs can be the computer processing time required to execute the processes described herein.

The prediction can then be utilized to modify the pumping plan for the current treatment stage or the pumping plan for a future treatment stage, such as being used by a well site engineer to modify the treatment stage or being used by a well site controller to automatically adjust the treatment stage. The modifications to the treatment stage can include one or more of continuing with the pumping plan, changing a HF fluid flow rate, changing a concentration of a proppant, changing a concentration of a chemical, changing a concentration of a solid, changing a diverter schedule, and other pumping plan parameters.

The calibration for the values of the unknown parameters can utilize a variety of methods, such as the methods described in FIGS. 4-7, using various HF fluid pressure values and HF fluid flow rate values, depending upon the availability of such values and the required accuracy. For example, the model equations selected can change depending upon whether data from downhole DAS is available.

The prediction of the distribution result, utilizing the predictive model and the calibrated values of the unknown parameters, can predict an end state of the downhole material distribution of the treatment stage. The prediction process utilizes a non-linear solution of a system of equations, and as such, more than one solution set is possible. Various constraints can be applied to ensure uniqueness of the solution or a limited number of potential solutions. For example, constraints can be ensuring that all HF fluid flow rates are positive, preserving the total mass of material being transported through the perforation clusters, and other constraints applicable to the treatment stage and well site.

The first step of the process can be to determine the predictive model, which can be one of various models that describes the HF fluid pressure at a specified perforation cluster over a time interval. The parameters of the predictive model can be identified as known parameters, where the values of the parameters are known or can be estimated, control parameters, where the values are unknown and the values can be implied, estimated or assumed, and unknown parameters, where the unknown parameters are the target of the calibration process. An example predictive model is shown in Equation 1.

Equation 1: Example predictive model algorithm $$P_{wb,i}(q_i,X,Y,t_j)=\Delta P_{perf,i}\Delta P_{tort,i}\Delta P_{frac,i}S_{hmin,i}$$

where $q_i$ is the HF fluid flow rate through fracture cluster i;
  X are the known inputs to the predictive model, such as subterranean formation parameters, near wellbore parameters, and completion parameters;
  Y are the unknown parameters that need to be calibrated;
  $t_j$ is the current time within the time interval;
  $P_{wb,i}$ is the HF fluid pressure at the near wellbore zone at the perforation cluster i;
  $\Delta P_{perf,\,i}$ is the reduction in HF fluid pressure at the perforation cluster i;
  $\Delta P_{tort,\,i}$ is the reduction in HF fluid pressure due to the tortuosity of the HF fluid path at fracture cluster i;
  $\Delta P_{frac,\,i}$ is the reduction in HF fluid pressure due to the friction in fracture cluster i; and
  $S_{hmin,\,i}$ is the minimum in-situ stress, e.g., HF fluid pressure, at the fracture cluster.

The bottom hole HF fluid pressure at an active perforation cluster can be determined using a gauge located at the perforation cluster location or the bottom hole pressure can be derived using Equation 2.

Equation 2: Example bottom hole HF fluid pressure calculation using a reference location $$P_{bh}=P_{ref}+P_{hyd}+P_{fric}$$

where $P_{bh}$ is the HF fluid pressure at the bottom hole location;
  $P_{ref}$ is the reference HF fluid pressure which can be measured at the surface or using a bottom hole gauge, such as at the first perforation cluster, e.g., nearest the heel of the HF wellbore;
  $P_{hyd}$ is the hydrostatic pressure at the active perforation cluster relative to the reference HF fluid pressure measurement; and
  $P_{fric}$ is the friction HF fluid pressure loss in the wellbore between the reference pressure location and the active perforation cluster location.

The second step can be to calibrate the values of the unknown parameters. Various techniques can be utilized depending on the parameters available, such as the HF fluid flow rate parameters. With the HF fluid flow rate parameters available, a first calibration technique (see method 400 in FIG. 4) can utilize a system of non-linear equations such that $P_{wb,i}$ ($Q_i$, X, Y, t) represents a vector of the values of $P_{wb,i}$ obtained from the predictive model for the time points considered within the time interval. $Q_i$ is the measured HF fluid flow rate through each active perforation cluster. The first calibration technique assumes that the HF fluid pressures at the wellbore, upstream of each active perforation cluster, are identical. The first calibration technique is demonstrated in Equation 3. Equation 3 can be solved, for example, using a non-linear least squares method where a Y is selected that minimizes $\Sigma(\Delta P(t))^2$ and is subject to the predictive model constraints.

Equation 3: Example calibration algorithm when HF fluid flow rate parameters are available $$\begin{pmatrix} P_{wb,1}(Q_1, X, Y, t) - P_{BH}(t) \\ \vdots \\ P_{wb,N}(Q_N, X, Y, t) - P_{BH}(t) \end{pmatrix} = \Delta P(t) = 0$$

where $P_{BH}$ is the bottom hole HF fluid pressure at time t.

Figure 5:
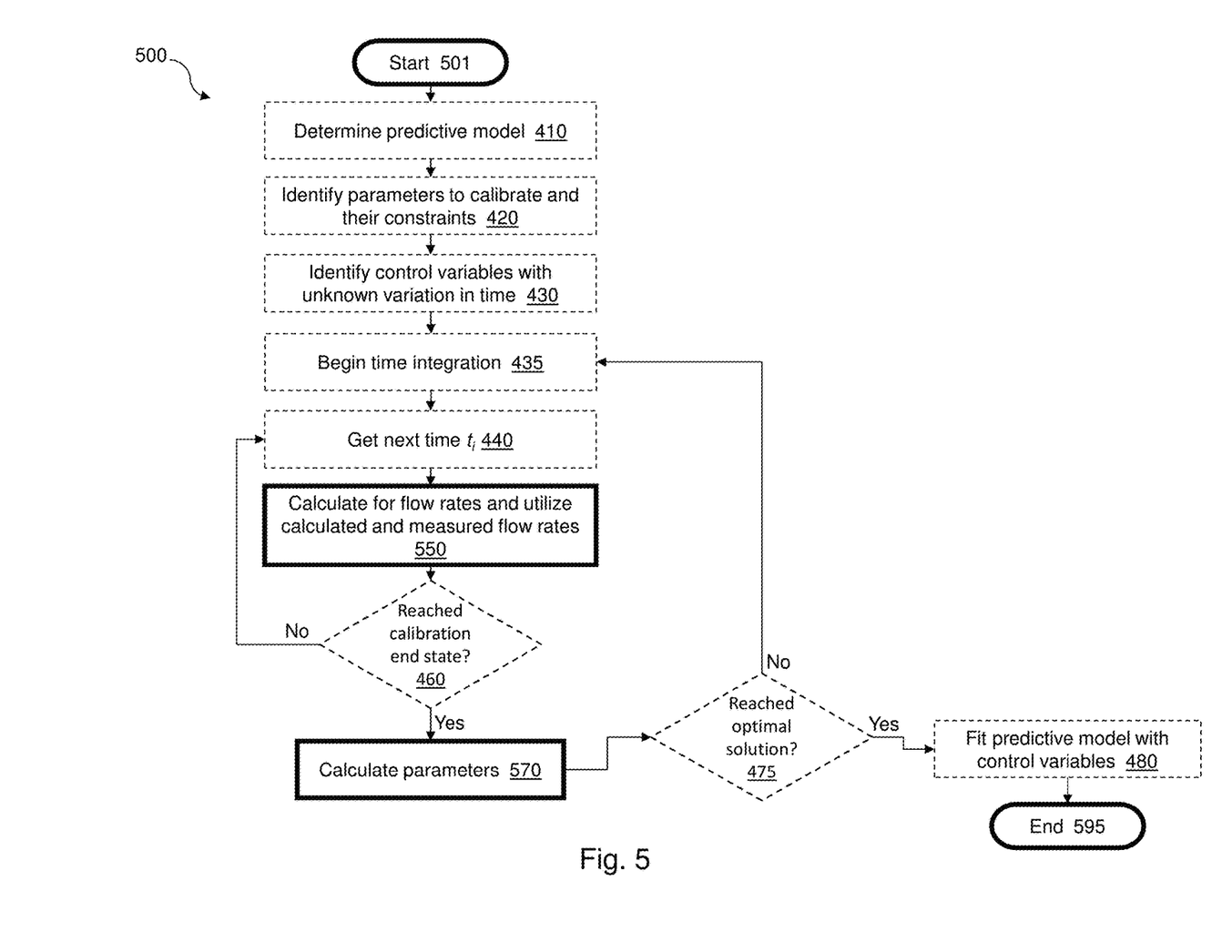
FIG. 5 is an illustration of a flow diagram of an example alternate calibration method for the predictive model using calculated and measured HF fluid flow rates.

An alternate calibration technique can be used when the HF fluid flow rate parameters are available (see method 500 in FIG. 5). The alternate calibration technique can utilize a system of non-linear equations such that $P_{wb,i}$ ($q_i$, X, Y, t) represents a vector of the values of $P_{wb,i}$ obtained from the predictive model for the time points considered within the time interval, such as shown in Equation 4. $q_i$ is the calculated HF fluid flow rate through each active perforation cluster and $Q_i$ is the measured HF fluid flow rate, such as from a DAS device, through each active perforation cluster. The alternate calibration technique assumes that the HF fluid pressures at the wellbore, upstream of each active perforation cluster, are identical. One method for solving the system of equations is to use a non-linear least squares method where Y can be determined that minimizes $$\Sigma \left( \Delta \left( \frac{P(t)}{q(t)} \right) \right)^2$$

and is subject to the predictive model constraints.

Equation 4: Example alternate calibration system of equations $$\begin{pmatrix} P_{wb,1}(q_1, X, Y, t) - P_{BH}(t) \\ \vdots \\ P_{wb,N}(q_N, X, Y, t) - P_{BH}(t) \\ q_1(t) - Q_1(t) \\ \vdots \\ q_n(t) - Q_n(t) \end{pmatrix} = \Delta \left( \frac{P(t)}{q(t)} \right) = 0$$

Each $q_i$, at time $t_j$, can be calculated by using a system of non-linear equations, for example, as shown in Equation 5.

Equation 5: Example algorithm to solve for $q_i$ $$\begin{pmatrix} \Sigma q_i - Q \\ P_{wb,1}(q_1, X, Y, t_j) - P_{wb,2}(q_2, X, Y, t_j) \\ \vdots \\ P_{wb,N-1}(q_{N-1}, X, Y, t_j) - P_{wb,N}(q_N, X, Y, t_j) \end{pmatrix} = 0$$

Figure 6:
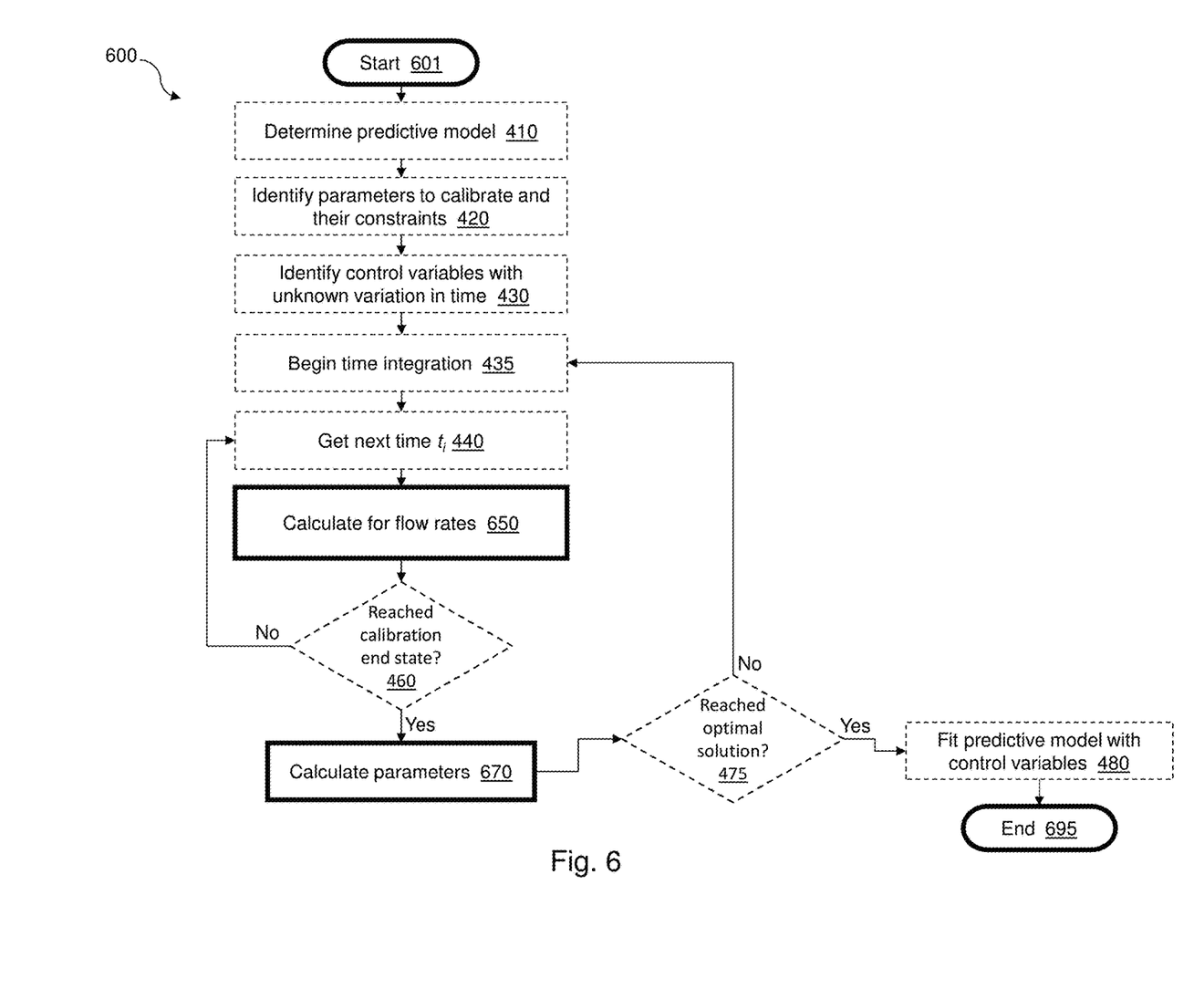
FIG. 6 is an illustration of a flow diagram of an example third calibration method for the predictive model using calculated HF fluid flow rates.

A third calibration technique can be used when the HF fluid flow rate parameters are not available (see method 600 in FIG. 6). The third calibration technique can utilize a system of non-linear equations such that $P_{wb,i}$ ($q_i$, X, Y, t) represents a vector of the values of $P_{wb,i}$ obtained from the predictive model for the time points considered within the time interval, such as shown in Equation 6. $q_i$ is the calculated HF fluid flow rate through each perforation cluster using, for example, equation 5. The third calibration technique assumes that the HF fluid pressures at the wellbore, upstream of each perforation cluster, are identical. One method for solving the system of equations is to use a non-linear least squares method where Y can be determined that minimizes $\Sigma(\Delta P(t))^2$ and is subject to the predictive model constraints.

Equation 6: Example third calibration system of equations $$\begin{pmatrix} P_{wb,1}(q_1, X, Y, t) - P_{BH}(t) \\ \vdots \\ P_{wb,N}(q_N, X, Y, t) - P_{BH}(t) \end{pmatrix} = \Delta P(t) = 0$$

In addition to the calibrating techniques described above, other available measurements can be used to calibrate the unknown parameters. For example, data from sensors of the well system can be used. The sensors can be temporarily employed in the well system to obtain measurements or the sensors may be permanently installed. Different types of sensors, such as optical sensors and electrical sensors, can be used, and measurements from a combination of the different types of sensors can be used. Micro-seismic data, point data, and distributed data are some examples of optic sensing data that can be employed for calibrating the unknown parameters.

Permanently installed sensors can be used, such as fiber optic cables cemented in place in the annular space between the casing and formation. The fiber optic cables can be clamped to the outside of the casing during the deployment, and protected by centralizers and cross coupling clamps. Other types of permanent sensors can include surface and down-hole pressure sensors, where the pressure sensors can be capable of collecting data at rates up to 2,000 Hertz (Hz) or even higher.

The fiber optic cables can house one or several optical fibers and the optical fibers can be single mode fibers, multi mode fibers, or a combination of single mode and multi mode optical fibers. The fiber optic sensing systems connected to the optical fibers can include Distributed Temperature Sensing (DTS) systems, Distributed Acoustic Sensing (DAS) Systems, Distributed Strain Sensing (DSS) Systems, quasi-distributed sensing systems where multiple single point sensors are distributed along the optical fibers, and single point sensing systems where the sensors are located at the end of the fiber optic cable.

The fiber optic sensing systems may operate using various sensing principles, including, but not limited to, amplitude based sensing systems (such as DTS systems utilizing Raman scattering), phase based sensing systems (such as DAS systems utilizing interferometric sensing using homodyne or heterodyne techniques where the system can sense phase or intensity changes due to constructive or destructive interference), strain based sensing systems (such as DSS using dynamic strain measurements utilizing interferometric sensors or static strain sensing measurements using Brillouin scattering), quasi-distributed based sensing systems (such as Fiber Bragg Gratings (FBGs) where a wavelength shift is detected or multiple FBGs can be used to form Fabry-Perot type interferometric sensors for phase or intensity based sensing), and single point fiber optic based sensing systems (such as Fabry-Perot, FBG, and intensity based sensors).

Electrical sensors may be pressure sensors utilizing quarts type sensors, strain gauge based sensors, and other commonly used sensing technologies. Pressure sensors, which can utilize optical techniques, electrical techniques, or a combination thereof, can be housed in dedicated gauge mandrels or attached outside the casing in various configurations for down-hole deployment or deployed conventionally at the surface well head or flow lines.

Various hybrid approaches where single point, quasi-distributed, and distributed fiber optic sensors are mixed with electrical sensors can also be used. The fiber optic cable may include optical fiber and electrical conductors.

Temperature measurements from a DTS system can be used to determine locations for fluid inflow in the treatment well as the fluids from the surface are likely to be cooler than formation temperatures. It is known in the industry to use DTS warm-back analyses to determine fluid volume placement, as is often done for water injection wells and the same technique can be used for fracturing fluid placement. Temperature measurements in observation wells can be used to determine fluid communication between the treatment well and observation well, or to determine formation fluid movement.

DAS data can be used to determine fluid allocation in real-time, or near real-time, as acoustic noise can be generated as fluid flows through the casing and through perforations into the formation. Phase and intensity interferometric sensing systems are sensitive to temperature and mechanical vibrations, as well as acoustically induced vibrations. DAS data can be converted from time series data to frequency domain data using Fast Fourier Transforms (FFT). Other transforms, such as wavelet transforms, can be used to generate different representations of the data.

Various frequency ranges can be used for different purposes. For example, low frequency signal changes can be attributed to formation strain changes or fluid movement, while other frequency ranges can be indicative of fluid, e.g., gas, movement. Various filtering techniques can be applied to generate indicators of events. Indicators can include formation movement due to growing natural fractures, formation stress changes during the fracturing operations, e.g., stress shadowing, fluid seepage during the fracturing operation as formation movement can force fluid into an observation well, fluid flow from fractures, fluid and proppant flow from fracture hits. The indicators can have a characteristic signature in terms of frequency, content, amplitude, and time dependent behavior. These indicators can be present in DAS data and other collected data types.

DAS systems can be used to detect various seismic events where stress fields and growing fracture networks generate microseimic events. The resulting perforation charge events can be used to determine travel time between horizontal wells. The travel time can be used from stage to stage to determine changes in travel time as the formation is fractured and filled with fluid and proppant. The DAS systems can also be used with surface seismic sources to generate vertical seismic profiles before, during, and after a fracturing job to determine the effectiveness of the fracturing job as well as determine production effectiveness.

DSS data can be generated using various approaches and static strain data can be used to determine absolute strain changes over time. Static strain data can be measured using Brillouin based systems or quasi-distributed strain data from FBG based systems. Static strain can also be used to determine propped fracture volume by analyzing deviations in strain data from a measured strain baseline before fracturing a stage. Formation properties can be determined, such as permeability, poroelastic responses, and leak off rates utilizing the change of strain over time and the rate of strain change over time. Dynamic strain data can be used in real-time, or near real-time, to detect fracture growth through an appropriate inversion model. The resulting information can be utilized to direct further well system operations to mitigate detrimental effects such as implementing dynamic changes to the fluid flow rates in the treatment well, the addition of diverter material, chemicals, and other additives into the fracturing fluid, and changes to proppant concentrations and proppant type.

FBG systems can also be utilized for collecting measurements. FBG systems can be partial reflectors that can be used as temperature and strain sensors, and can be used to make various interferometric sensors with high sensitivity. FBG systems can be used to make point sensors and quasi-distributed sensors where these sensors can be used independently and with other types of fiber optic based sensors. FBG systems can be part of an optical fiber at a specific wavelength, and other system, such as DAS, DSS, and DTS systems, can operate at different wavelengths as part of the same optical fiber. Each sensing system can measure different parameters simultaneously, for example, using Wavelength Division Multiplexing (WDM). The various described sensors can be placed in the treatment well, observation well, or a combination thereof. The treatment well pressure, rate, proppant concentration, diverter material, fluids, and chemicals can be altered to change the HF treatment. These changes can impact the formation responses in several ways. For example, stress fields can change which can generate microseismic effects that can be measured with DAS systems and single point seismic sensors, such as geophones. Fracture growth rates can change which can generate changes in measured microseismic events and event distributions over time, and can generate changes in measured strain, such as from using the low frequency portion of collected data from the DAS and Brillouin sensing systems. Pressure changes due to poroelastic effects can be measured in the monitoring well. Pressure data can be measured in the treatment well and correlated to formation responses. Various changes in treatment fluid flow rates and fluid pressure can generate events that can be correlated to fracture growth rates. Several of the above described measurements can be combined, and this information can be used to change the HF treatment stage plan to generate desired outcomes.

The third step is to predict a distribution result of the downhole material. Once the values of the unknown parameters are calibrated, the values of the unknown parameters, now assumed to be known, can be applied to Equation 5 to solve for $q_i$, where the time parameter extends between two points in time, for example, starting at the time the calibration step was executed to the time at which the treatment stage ends. Using the predicted distribution result, a well system engineer or operator can adjust and modify the treatment stage, the pumping plan for the treatment stage, and other parameters affecting the downhole material distribution. The remaining portion of the treatment stage can be executed with the modified parameters.

Alternately, more than one execution of the three steps can be conducted, where the modifications made by the well site engineer or operator are applied as the original input parameters so that a new distribution result can be predicted. The modifications can be from the predicted distribution result or other parameters that can be evaluated through the prediction algorithm. The number of execution cycles can be specified or be determined by the well site engineer or operator, such as until a specific treatment stage goal is achieved. The final set of modified parameters can be used to modify the treatment stage for the well site. In other aspects, an automated decision system can be used in place of the well site engineer or operator so that the well site controller can analyze the downhole material distribution and automatically make adjustments to the treatment stage plan.

Figure 1:
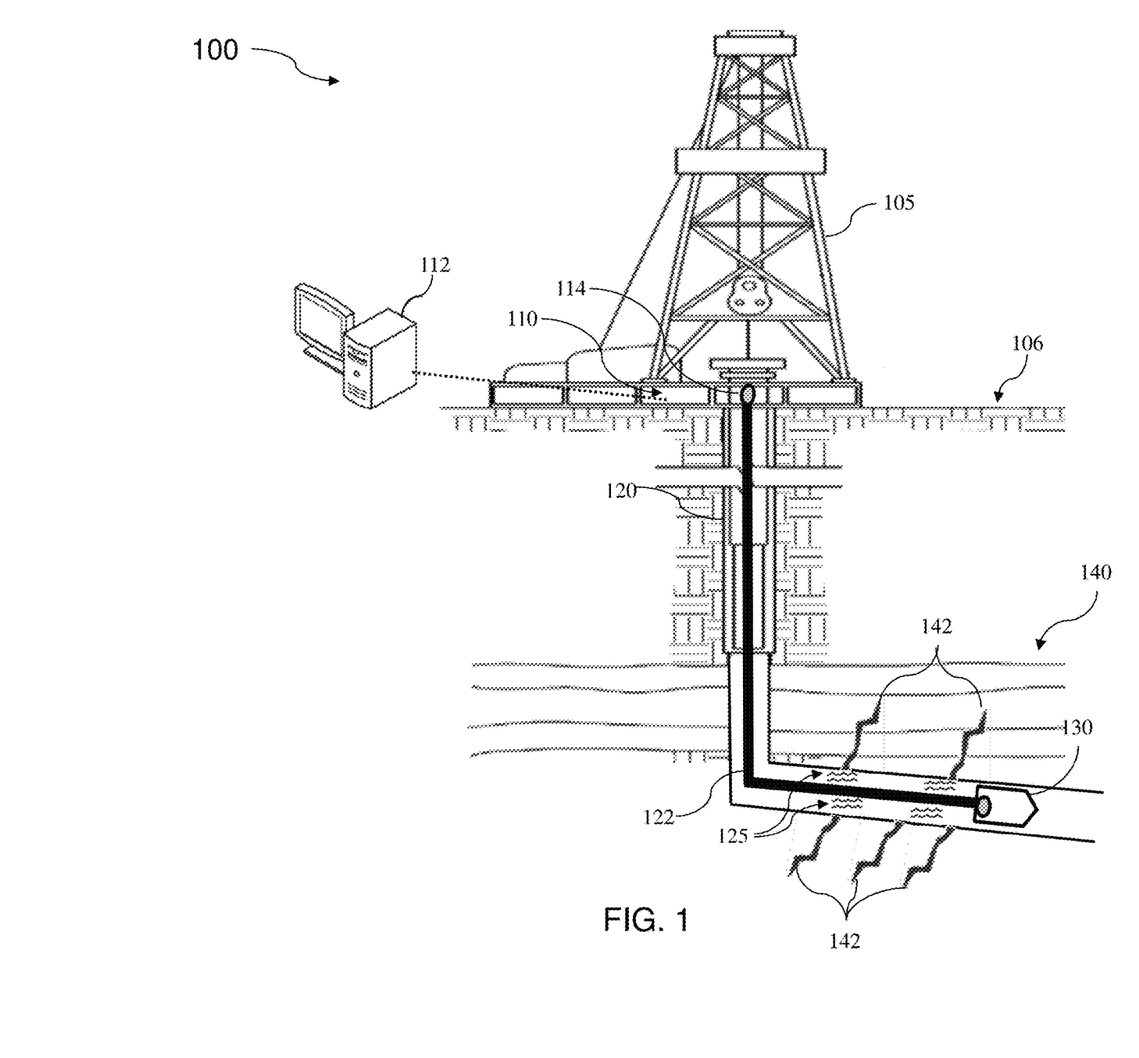
FIG. 1 is an illustration of a diagram of an example hydraulic fracturing (HF) well system.

Turning now to the figures, FIG. 1 is an illustration of a diagram of HF well system 100, which can be a well site where HF operations are occurring through the implementation of a HF treatment stage plan. HF well system 100 demonstrates a nearly horizontal wellbore undergoing a fracturing operation. Although FIG. 1 depicts a specific wellbore configuration, those skilled in the art will understand that the disclosure is equally well suited for use in wellbores having other orientations including vertical wellbores, horizontal wellbores, slanted wellbores, multilateral wellbores, and other wellbore types. FIG. 1 depicts an onshore operation. Those skilled in the art will understand that the disclosure is equally well suited for use in offshore operations.

HF well system 100 includes a surface well equipment 105 located at a surface 106, a well site control equipment 110, and a HF pump system 114. In some aspects, well site control equipment 110 is communicatively connected to a separate computing system 112, for example, a separate server, data center, cloud service, tablet, laptop, smartphone, or other types of computing systems. Computing system 112 can be located proximate to well site control equipment 110 or located a distance from well site control equipment 110, and can be utilized by a well system engineer and operator to review recommendations stemming from the predicted distribution results.

Extending below surface 106 from surface well equipment 105 is a wellbore 120. Wellbore 120 can have zero or more cased sections and a bottom section that is uncased. Inserted into the wellbore 120 is a fluid pipe 122. The bottom portion of fluid pipe 122 has the capability of releasing downhole material 125 from fluid pipe 122 to the surrounding subterranean formation 140. The release of downhole material 125 can be by perforations in fluid pipe 122, by valves placed along fluid pipe 122, or by other release means. At the end of fluid pipe 122 is a bottom hole assembly (BHA) 130. BHA 130 can be one or more downhole tools, including an endcap assembly.

In HF well system 100, fluid pipe 122 is releasing downhole material 125 into subterranean formation 140 at a determined HF fluid pressure and HF fluid flow rate. Downhole material 125 is being absorbed by, e.g., enter or flowing into, several fracture clusters 142. The predicted distribution result of the downhole material can be utilized as an input into a pumping plan for HF well system 100, such as for the pumping plan of the treatment stage. The insights gained from the predicted distribution results can be used by well site control equipment 110 to modify the treatment stage, such as adjusting the concentration, HF fluid pressure, HF fluid flow rate, and timing of release, of downhole material.

Well site control equipment 110 can include a well site parameter collector that can collect sensor data from sensors proximate to the well site and located within the wellbore, such as a downhole HF fluid pressure gauge and a DAS. Well site control equipment 110 and computing system 112 can include a downhole material predictor system capable of receiving downhole data, such as HF fluid pressure, HF fluid flow rate, predictive model parameters, wellbore parameters, and other data, and predict a distribution of downhole material.

In an alternative aspect, computing system 112 can be located a distance from HF well system 100, such as in a data center, server, or other system, and computing system 112 can be disconnected from HF well system 100. In this aspect, computing system 112 can receive predictive model parameters, along with the wellbore parameters, treatment stage parameters, and other parameters, where the various parameters were collected by the other components of HF well system 100. The downhole material predictor can be part of computing system 112 and can produce a recommendation on the modifications to the treatment stage.

Figure 2:
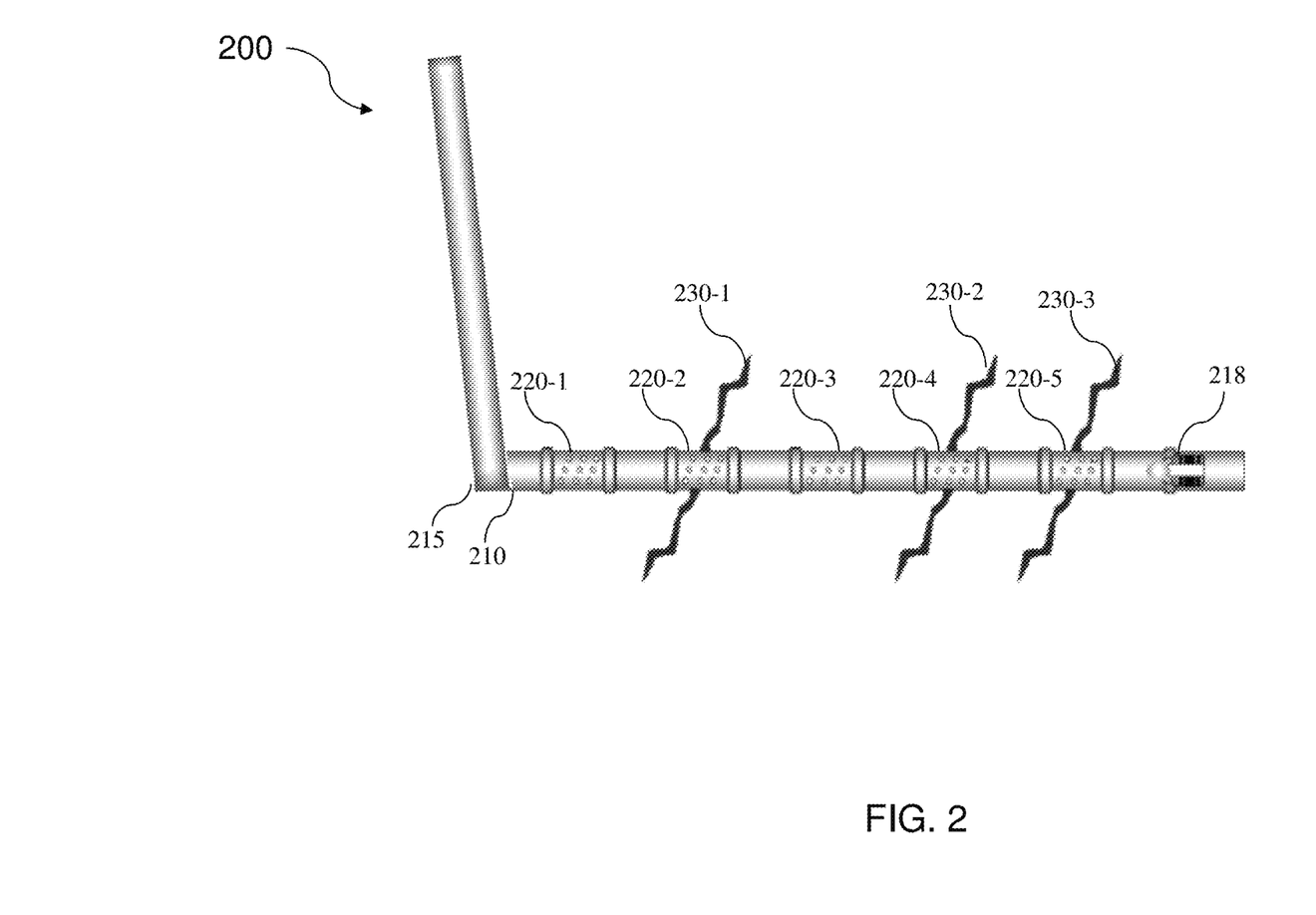
FIG. 2 is an illustration of a diagram of an example HF fluid pipe system.

FIG. 2 is an illustration of a diagram of example HF fluid pipe system 200, demonstrating multiple perforations clusters and multiple fracture clusters. HF fluid pipe system 200 includes a fluid pipe 210, with a bottom hole assembly (BHA) 218. BHA 218 can be an end cap or BHA 218 can include one or more tools and sensors. Fluid pipe 210 has a heel 215 where the fluid pipe 210 turns to an approximate horizontal orientation from the original wellbore orientation.

Fluid pipe 220 is capable of providing a path for downhole material to be pumped from a surface location to a location within a HF wellbore. Fluid pipe 210 includes a perforation cluster 220-1, a perforation cluster 220-2, a perforation cluster 220-3, a perforation cluster 220-4, and a perforation cluster 220-5, collectively identified as perforation clusters 220. Fewer or additional perforation clusters 220 can be part of fluid pipe 210. All, some, or none, of perforation clusters 220 can include a HF fluid pressure gauge, and one or more perforation clusters can be active perforation clusters. When HF fluid pressure gauge information is not available at a specific perforation cluster 220, a reference location can be utilized, as demonstrated in Equation 2. Perforation cluster 220-1 can be identified as the first perforation cluster, e.g., nearest the heel 215, and can be utilized as the reference location for Equation 2.

Proximate fluid pipe 210, and extending into the surrounding subterranean formation, is a fracture cluster 230-1, a fracture cluster 230-2, and a fracture cluster 230-3, collectively, fracture clusters 230. Fewer or additional fracture clusters 230 can be part of the subterranean formation. In addition, the orientation of fracture clusters 230 can vary as to what is shown. The number of fracture clusters 230 does not need to match the number of perforation clusters 220.

Figure 3:
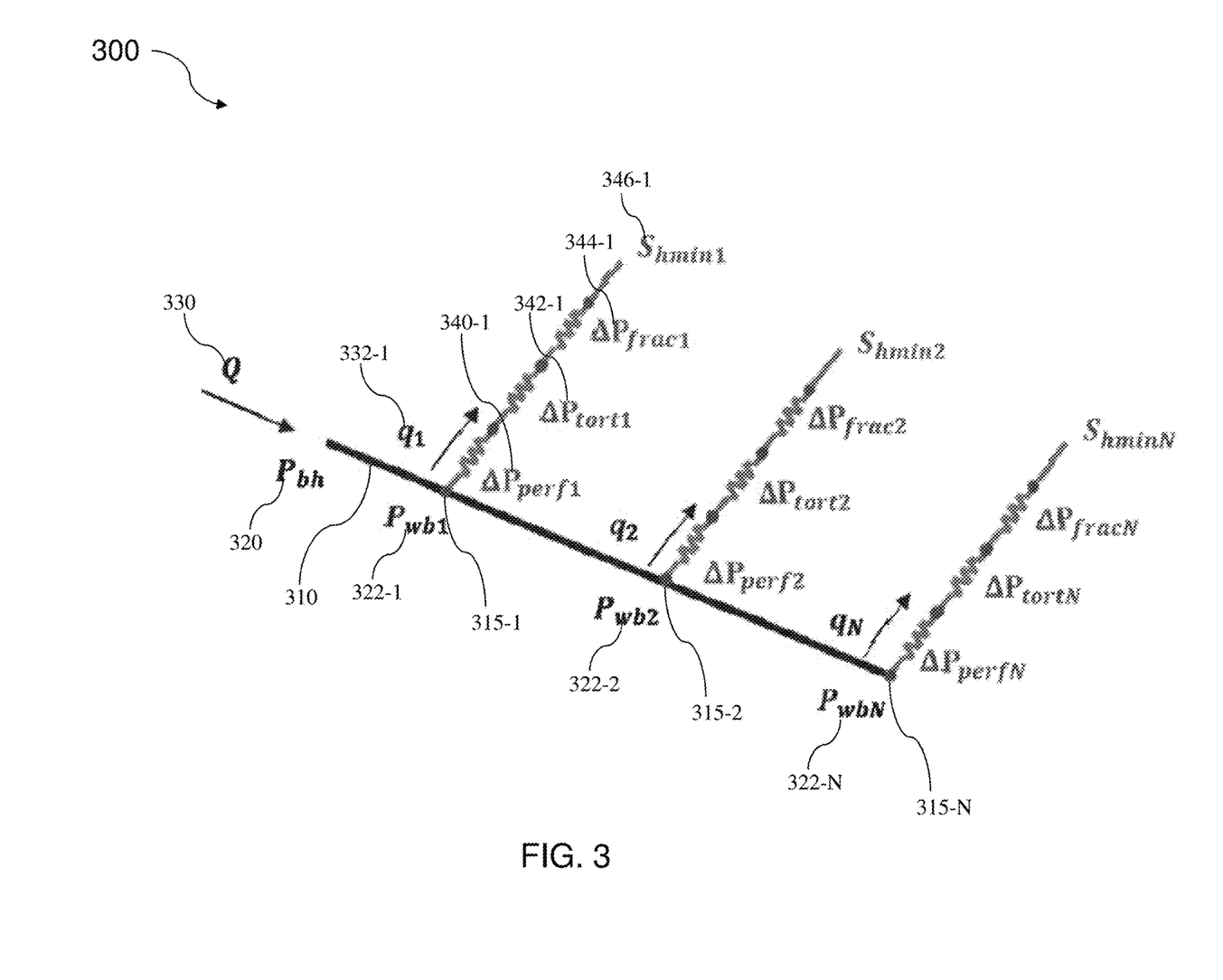
FIG. 3 is an illustration of a schematic diagram of an example predictive model for downhole material distribution using a resistor-type model.

FIG. 3 is an illustration of a schematic diagram of an example predictive model 300 for downhole material distribution using a resistor-type model, demonstrating Equation 1 as applied to a fluid pipe/fracture cluster scenario. Predictive model 300 includes a fluid pipe 310 with an active perforation cluster 315-1, an active perforation cluster 315-2, and an active perforation cluster 315-N, collectively referred to as active perforation clusters 315. There can be fewer or additional active perforation clusters as indicated by N. In this demonstration, each of active perforation clusters 315 have a corresponding fracture cluster.

Downhole material is pumped through fluid pipe 310, using HF fluid, to the active perforation clusters 315. The downhole material has a HF fluid flow rate (Q) 330 and a bottom hole HF fluid pressure ($P_{bh}$) 320. Q 330 and $P_{bh}$ are being measured by surface equipment in this example. In an alternate aspect, Q 330 and $P_{bh}$ can be measured using downhole equipment or a combination of surface and downhole equipment. At each of the active perforation clusters 315, there is an identified wellbore HF fluid pressure ($P_{wb}$). Active perforation cluster 315-1 has a $P_{wb}$ 322-1, active perforation cluster 315-2 has a $P_{wb}$ 322-2, and active perforation cluster 315-N has a $P_{wb}$ 322-N, collectively referred to as $P_{wb}$ 322.

The $P_{wb}$ 322 at a location, such as for active perforation cluster 315-1, can be reduced through various factors until it reaches a HF fluid pressure that is applied against the subterranean formation. $P_{wb}$ 322-1 is reduced by the HF fluid pressure drop 340-1 due to the perforation resistance, then reduced by the HF fluid pressure drop 342-1 due to the tortuosity of the HF fluid flow path, i.e., resistance of the subterranean formation, then reduced by the HF fluid pressure drop 344-1 due to friction in the fracture cluster, to then equal the HF fluid pressure applied 346-1 against the fracture cluster, e.g., the subterranean formation. Active perforation cluster 315-2 through active perforation cluster 315-N can similarly calculate their respective HF fluid pressure drops.

Figure 4:
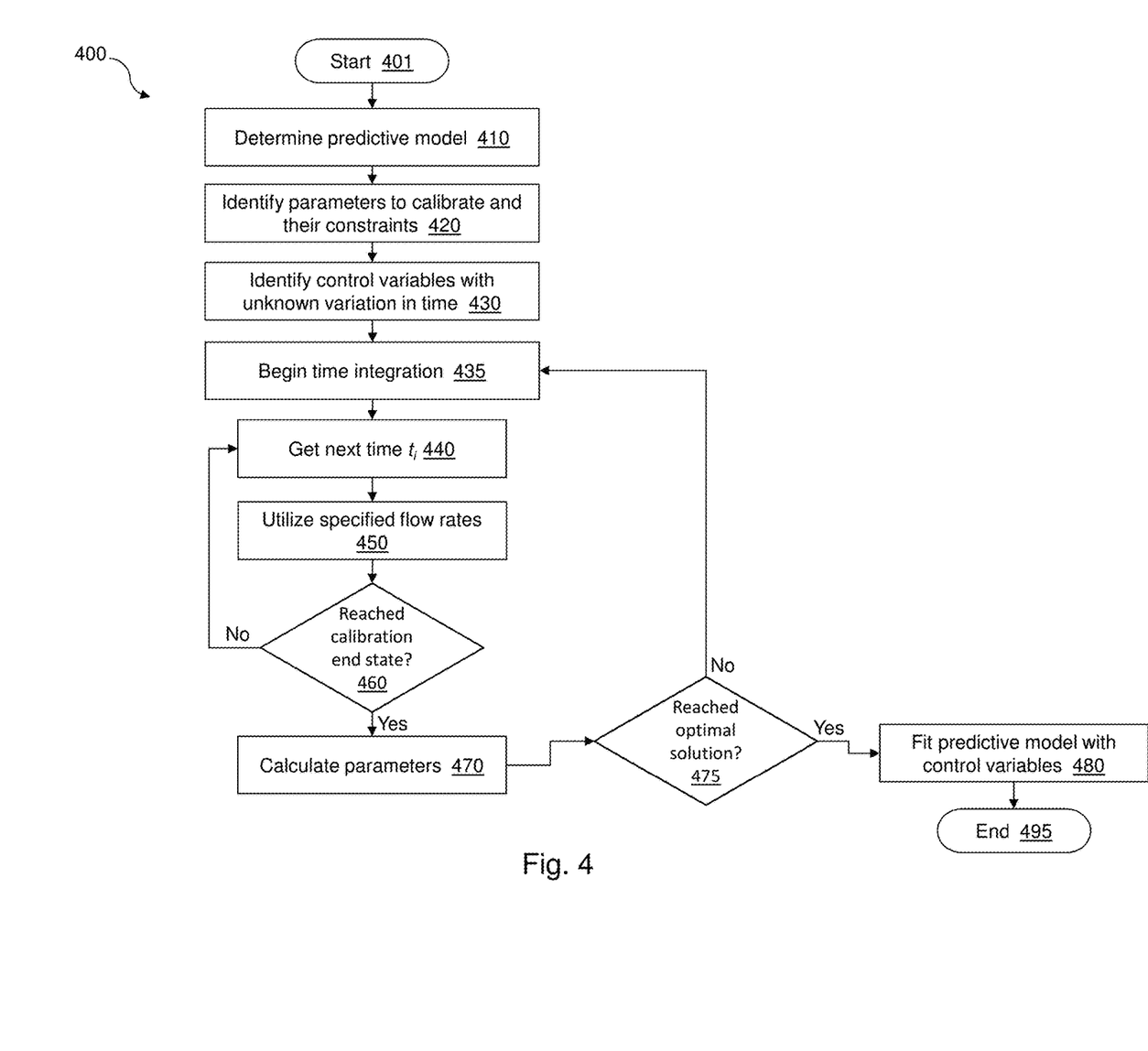
FIG. 4 is an illustration of a flow diagram of an example calibration method for the predictive model.
Figure 8:
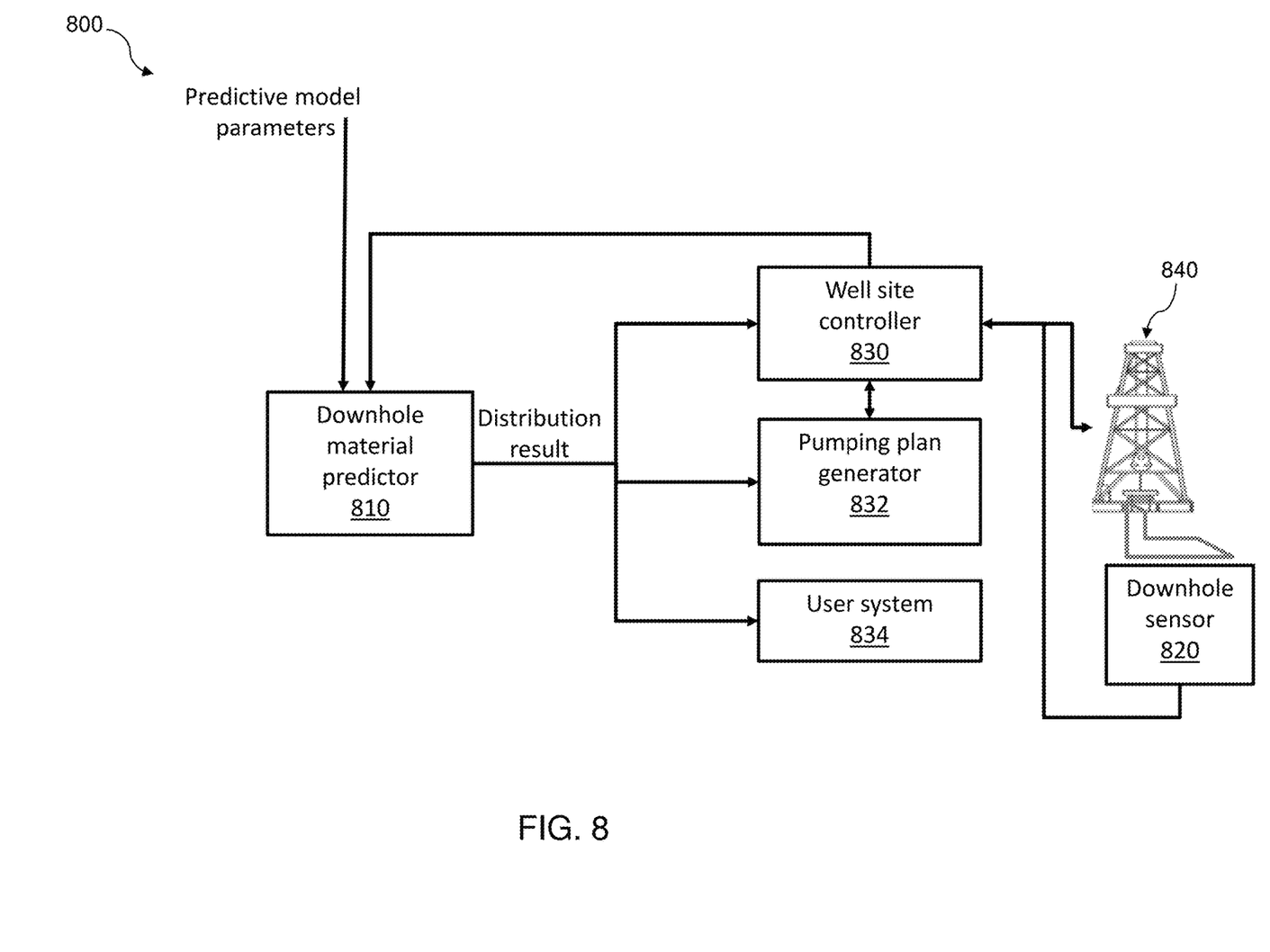
FIG. 8 is an illustration of a block diagram of an example downhole material distribution predictor system.

FIG. 4 is an illustration of a flow diagram of an example calibration method 400 for the predictive model. Calibration method 400 computes a calibration to be applied to values of unknown parameters of the predictive model and assumes that the downhole HF fluid flow rates Q are known at each active perforation cluster. Calibration method 400 can be carried out by a computer system capable of receiving the predictive model parameters and other parameters and executing the algorithms described herein, for example, the downhole material predictor as shown in FIG. 8.

Calibration method 400 starts at a step 401 and proceeds to a step 410 where the predictive model is determined. The predictive model includes the wellbore parameters (for example, temperature, pressure, and fluid pipe length), the treatment stage parameters (for example, a pumping plan and an operation plan), the subterranean formation parameters (for example, mineralogical properties), and the well site parameters, including the targeted goal of the treatment stage. The various parameters can be received from one or more devices and well site equipment, such as a well site controller, downhole sensors (for example, DAS), data stores (for example, located proximate or distant, such as a memory, hard drive, server, data center, and cloud storage), and other well site equipment.

In a step 420, parameters are identified to be calibrated, e.g., the unknown parameters. In addition, constraints for one or more of the unknown parameters can be identified, for example, density cannot be a negative value. In a step 430, control parameters with an unknown variation in time are identified. The control parameters can have an implied value, such as assuming the initial downhole HF fluid pressure at each active perforation cluster is constant or that the downhole HF fluid flow rate is constant. Method 400 can be performed more than once, and for each execution, the unknown parameters in step 420 and the control parameters in step 430 can be changed and their values modified.

In a step 435, the processing of the predictive model using the identified unknown parameters and the control parameters can begin using a time integration algorithm to determine how the predictive model changes over a time interval. In a step 440, the next time i within the time interval is selected. The time step used to determine i can be various values, such as thirty seconds, one minute, ten minutes, and twenty minutes. Other time step values can be used and is constrained by the specified time interval, the computing resources available, the time available to complete the method 400, and the length of time the treatment stage is to be executed.

In a step 450, the specified downhole HF fluid flow rates $Q_1$ to $Q_N$ are utilized to compute the downhole HF fluid pressure $P_1$ to $P_N$ at the time i. More than one solution can be computed and those solutions that do not satisfy the constraints can be eliminated. In a decision step 460, a determination can be made as to whether the calibration end state has been met. The calibration end state can be specified as calibrating received parameters within a satisfactory threshold constraint, as a specified time interval, or as another calibration end state. If the resultant is 'No', then method 400 proceeds to step 440. If the resultant is 'Yes', then method 400 proceeds to a step 470.

In step 470, the values of the unknown parameters are calibrated using Equation 3. In this step, the HF fluid pressure at each active perforation cluster can be assumed to be the same. In a decision step 475, the solutions computed in step 470 can be analyzed to determine if an optimum solution has been identified. An optimum solution can be a solution that satisfies all of the specified constraints and minimizes errors and costs. If more than one solution is available, the algorithm can select one of the solutions to use in the prediction step (see method 700 in FIG. 7). If the resultant is 'No', then method 400 proceeds to step 435. If the resultant is 'Yes', then the method proceeds to a step 480.

Figure 7:
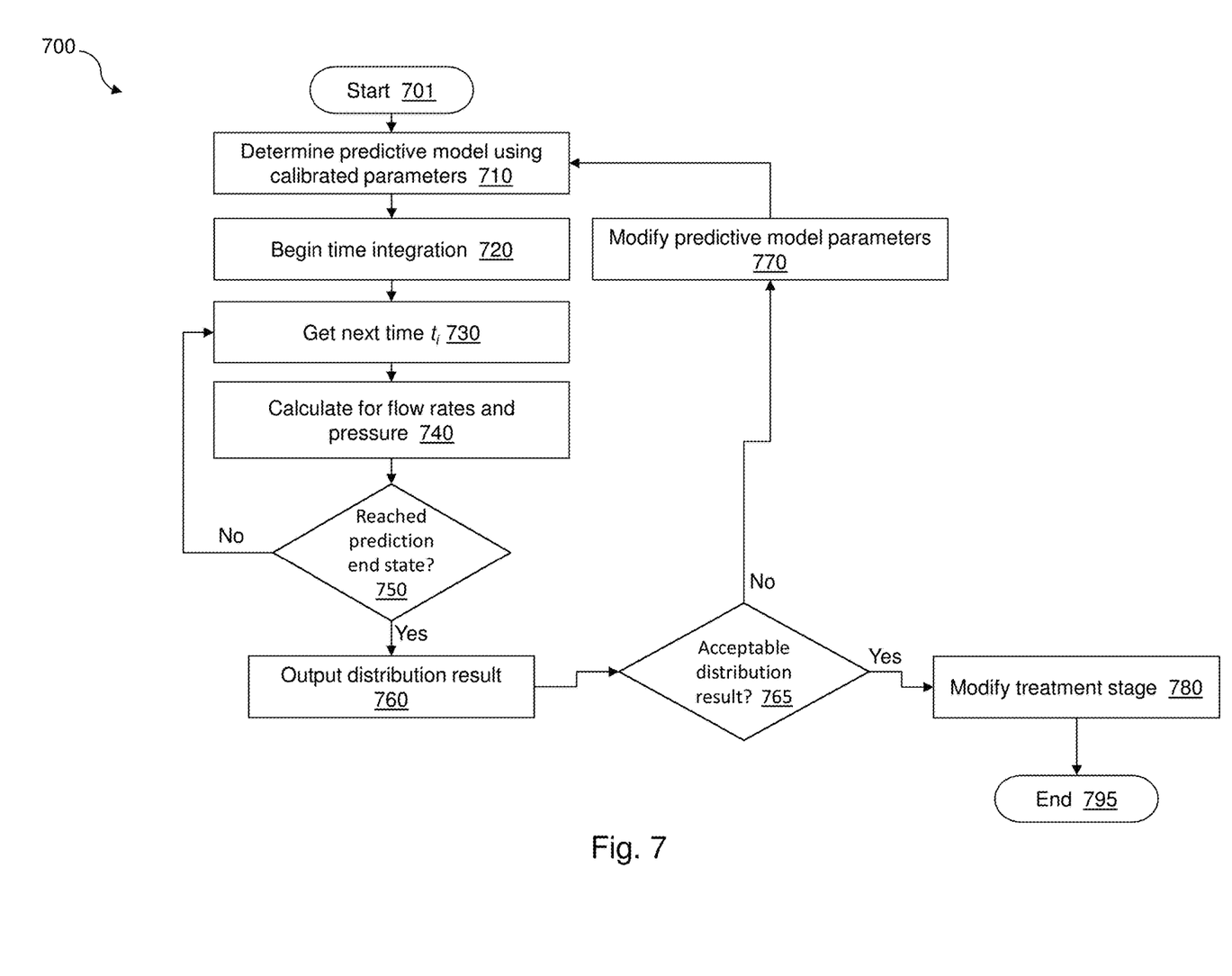
FIG. 7 is an illustration of a flow diagram of an example prediction method for the downhole material distribution.

In step 480, the predictive model is fitted, e.g., updated, with the computed parameters that are now calibrated. The updated predictive model can then be utilized by the prediction method 700. Method 400 ends at a step 495.

FIG. 5 is an illustration of a flow diagram of an example alternate calibration method 500 for the predictive model using calculated and measured HF fluid flow rates. Alternate calibration method 500 is similar to calibration method 400, with the differences highlighted below. Alternate calibration method 500 computes a calibration to be applied to the values of the unknown parameters of the predictive model and assumes that the downhole HF fluid flow rates Q are known at each perforation cluster while additionally computing the downhole HF fluid flow rates q at each perforation cluster. Calibration method 500 can be carried out by a computer system capable of receiving the predictive model parameters and other parameters and executing the algorithms described herein, for example, the downhole material predictor as shown in FIG. 8.

Alternate calibration method 500 starts at a step 501 and proceeds through the steps as is described in calibration method 400 until step 440. At step 440, the alternate calibration method 500 proceeds to a step 550 where the downhole HF fluid flow rates are calculated as q, for example, as shown in Equation 5. The calculated downhole HF fluid flow rate q is used to determine the HF fluid pressure at each active perforation cluster at time i. More than one solution can be computed and those solutions that do not satisfy the constraints can be eliminated. Alternate calibration method 500 proceeds to decision step 460. If the resultant of decision step 460 is 'Yes', then alternate calibration method 500 proceeds to a step 570.

In step 570, the non-linear pressure equality equations are solved as shown in Equation 4. Equation 4 utilizes the downhole HF fluid flow rates measured Q and computed q. A constraint can be used that states Q equals q. More than one solution can be computed and those solutions that do not satisfy the constraints can be eliminated. Alternate calibration method 500 proceeds to decision step 475. Proceeding from step 480, alternate calibration method 500 ends at a step 595.

FIG. 6 is an illustration of a flow diagram of an example third calibration method 600 for the predictive model using calculated HF fluid flow rates. Third calibration method 600 is similar to calibration method 400 and alternate calibration method 500, with the differences highlighted below. Third calibration method 600 computes a calibration to be applied to the values of the unknown parameters of the predictive model and assumes that the measured downhole HF fluid flow rates Q are unknown and relies on computing the downhole HF fluid flow rates q at each active perforation cluster. Since the measured downhole HF fluid flow rates are not known, third calibration method 600 can result in a less accurate prediction distribution result. Third calibration method 600 can be carried out by a computer system capable of receiving the predictive model parameters and other parameters and executing the algorithms described herein, for example, the downhole material predictor as shown in FIG. 8.

Third calibration method 600 starts at a step 601 and proceeds through the steps as is described in calibration method 400 until step 440. At step 440, the third calibration method 600 proceeds to a step 650 where the downhole HF fluid flow rates are calculated as q, for example, as shown in Equation 5. The calculated downhole HF fluid flow rate q is used to determine the downhole HF fluid pressure at each active perforation cluster at time i. More than one solution can be computed and those solutions that do not satisfy the constraints can be eliminated. Third calibration method 600 proceeds to decision step 460. If the resultant of decision step 460 is 'Yes', then third calibration method 600 proceeds to a step 670.

In step 670, the non-linear pressure equality equations are solved as shown in Equation 6. Equation 6 utilizes the downhole HF fluid flow rates computed as q. It is assumed that Q is set equal to the computed q for equation calculations. More than one solution can be computed and those solutions that do not satisfy the constraints can be eliminated. Third calibration method 600 proceeds to decision step 475. Proceeding from step 480, third calibration method 600 ends at a step 695.

FIG. 7 is an illustration of a flow diagram of an example prediction method 700 for the downhole material distribution. Prediction method 700 computes a prediction of a distribution result of downhole material using the computed parameters and the predictive model. Prediction method 700 can be carried out by a computer system capable of receiving the predictive model parameters and other parameters and executing the algorithms described herein, for example, the downhole material predictor as shown in FIG. 8.

Prediction method 700 starts at a step 701 and proceeds to a step 710. Step 710 determines the predictive model to utilize, using similar criteria and parameters used for calibration method 400, alternate calibration method 500, and third calibration method 600. The predictive model has been updated by step 480 where the previously unknown parameters have been calibrated and a value assigned to each of the parameters.

In a step 720, the processing of the predictive model using the calibrated parameters can begin using a time integration algorithm to determine how the predictive model changes over a time interval. The time interval and time step utilized in prediction method 700 can be the same or different time interval and time step used in calibration method 400, alternate calibration method 500, or third calibration method 600. The time interval and time step used can be constrained by a specified time interval, the computing resources available, the time available to complete the method 700, and the length of time the treatment stage is to be executed.

In a step 730, the next time i within the time interval is selected. In a step 740, the downhole HF fluid flow rates and HF fluid pressure at each active perforation cluster is computed. The computation can be completed by various algorithms, for example, Equations 3-6. In a decision step 750, a prediction end state is checked. The prediction end state can be various constraints, such as the time interval has reached the time the treatment stage would end, a specified amount of time has elapsed, and other end state conditions and constraints. If the resultant is "No", the prediction method proceeds to step 730. If the resultant is "Yes", the prediction method proceeds to a step 760.

In step 760, the predicted distribution result of the downhole material is output from the computation portion of the prediction method 700 to the analysis portion of prediction method 700. In a decision step 765, the predicted distribution result is analyzed to determine if the distribution result satisfies the constraints imposed by the goals of the treatment stage. The goals can be a specific distribution of downhole material, a cost minimization, an ease minimization, other treatment stage goals, and a combination of goals. If the resultant is "No", the prediction method 700 proceeds to a step 770. If the resultant is "Yes", the prediction method 700 proceeds to a step 780.

In step 770, the predictive model parameters are adjusted to try a different downhole material distribution model. For example, concentration of a downhole material can be adjusted, as well as the downhole HF fluid flow rate, and the schedule of release of a downhole material with other downhole material (such as a carrier fluid) can be adjusted. Proceeding to step 710, the predictive model is updated with the parameters for the adjusted downhole material distribution model.

In step 780, the modified downhole material model can be communicated to a user, such as a well system engineer and operator, or to a well site controller or other well site equipment. The recommended modifications can be applied to the current treatment stage or to a future treatment stage so that the targeted goals of the treatment stage can be better achieved. Prediction method 700 ends at a step 795.

FIG. 8 is an illustration of a block diagram of an example downhole material distribution predictor system 800. Downhole material distribution predictor system 800 is configured to receive predictive model parameters and sensor data and to generate a prediction of downhole material distribution, and includes a downhole material predictor 810 and downhole sensors 820. The prediction distribution result can be used by various systems, components, and users. Downhole material distribution predictor system 800 includes three example uses of the prediction distribution result, a well site controller 830, a pumping plan generator 832, and a user system 834. Pumping plan generator 832 can generate a pumping plan using the predicted distribution result and provide that pumping plan as a modification to the treatment stage to well site controller 830 of a well system 840. In an alternative aspect, pumping plan generator 832 can be part of well site controller 830.

Alone, or in combination with a prediction distribution result, well site controller 830 can execute treatment stages for the well system 840. In addition, well system 840 can provide information, such as HF treatment data, HF fluid pressure, HF flow rate, HF fluid composition, and other well system data to well site controller 830. Well site controller 830 can provide this information as parameter inputs to downhole material predictor 810.

Downhole material predictor 810 is configured to receive the predictive model parameters. The predictive model parameters can be received from one or more of well site equipment, a data store, a cloud storage, a data center, server, and other computing storage systems, or a combination of such computing storage systems. Inputs into the predictive model can be received directly from sensors, or through the well site controller 830, such as sensors located at the surface of the well site (for example, HF fluid pressure and HF fluid flow rate gauges, and downhole material composition analyzers) and sensors located downhole, such as within the wellbore (for example, bottom hole HF fluid pressure gauges and DAS). Downhole sensors 820 are one or more of the sensors located within the wellbore of well system 840. In some aspects, one or more of the active perforation clusters on the fluid pipe in the well system 840 can have one or more associated downhole sensors 820.

Downhole material predictor 810, upon receiving the predictive model and other parameter inputs, can, at prescribed times, execute the algorithms and processes described herein. Depending on the parameters available, downhole material predictor 810 can select a calibration algorithm, such as shown in Equations 3-6. The calibrated parameters, formerly the unknown parameters, can be utilized in the prediction algorithm to produce a predicted distribution result. The prediction algorithm can be executed more than once to determine a best fit solution that best satisfies the targeted goals of the treatment stage. The best fit solution can be output as a recommendation for the treatment stage pumping plan.

Downhole material predictor 810 can be a processor or electronic circuitry configured to perform the functionalities described herein. In one example, downhole material predictor 810 is a set of instructions running on a computing system, such as an application, function, routine, library, or a portion of an application, that direct the operation of the computing system. In some examples, downhole material predictor 810 is a combination of processors and operating instructions. In an alternate aspect, downhole material predictor 810 can be part of well site controller 830, pumping plan generator 832, or a combination thereof.

Once the best fit distribution result has been generated, downhole material predictor 810 can communicate the modifications of the treatment stage and associated parameters to another system. The receiving systems can be well site controller 830, pumping plan generator 832, or user system 834. Pumping plan generator 832 can use the received modifications to modify the pumping plan of the treatment stage, such as adjusting the concentration, HF fluid flow rate, and release timing of various components of the downhole material into the wellbore. The well site controller 830 can use the modifications to update an executing treatment stage to make real-time or near real-time adjustments. The user system 834 can use the modification parameters for the above uses and other uses as well where user interaction and decision making is used for further processing. The user system 834 can be a display, monitor, printer, smartphone, tablet, laptop, server, and other systems and devices capable of receiving the recommended modification parameters and allowing user access to the predicted distribution result and the modified parameters for the pumping plan.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:
A. A method to determine a distribution of a downhole material for a treatment stage of a HF well site, including: (1) determining a predictive model of the well site, (2) calibrating values of unknown parameters of the predictive model, and (3) predicting a distribution result of the downhole material for active perforation clusters of the well site.
B. A system to determine a distribution of a downhole material for a well site, including: (1) a fluid sensor, located at the well site, and operable to collect one or more of a surface HF fluid pressure parameter, a surface proppant concentration parameter, a downhole HF fluid pressure parameter, a surface HF fluid flow rate parameter, and a downhole HF fluid flow rate parameter, wherein the well site is a HF well site, and (2) a downhole material predictor, operable to determine a predictive model using received predictive model parameters, modify the predictive model using parameters received from the fluid sensor, calibrate values of unknown parameters of the predictive model using a calibration process on a part or whole of the current or previous pumping stage, and predict a distribution result of the downhole material for one or more active perforation clusters of the well site.

C. A computer program product having a series of operating instructions stored on a non-transitory computer-readable medium that directs a data processing apparatus when executed thereby to perform operations to determine a distribution of a downhole material for a treatment stage of a HF well site, the operations including: (1) determining a predictive model of the well site, (2) calibrating values of unknown parameters of the predictive model, and (3) predicting a distribution result of the downhole material for active perforation clusters of the well site.

Each of aspects A, B, and C can have one or more of the following additional elements in combination: Element 1: modifying a pumping plan of the treatment stage utilizing the distribution result. Element 2: wherein the modifying includes one or more of continuing with the pumping plan, changing a HF fluid flow rate, changing a concentration of a proppant, changing a concentration of a chemical, changing a concentration of a solid, and changing a diverter schedule. Element 3: repeating the calibrating and predicting steps at least one time during an execution of the treatment stage. Element 4: wherein the predictive model is a resistor-type predictive model. Element 5: wherein the predictive model is a physical model that includes one or more of HF fluid pressure parameters for at least one of the active perforation clusters, fracture cluster HF fluid flow rate, subterranean formation properties, properties of all pumped materials including the downhole material, and completion properties of the well site. Element 6: wherein the downhole material is one or more of slurrys, oil-based fluids, water-based fluids, proppants, chemicals, solids, and diverter material. Element 7: identifying the unknown parameters utilizing user input. Element 8: wherein the values of the unknown parameters are calibrated for each active perforation cluster utilizing one or more of a measured HF fluid flow rate, a calculated HF fluid flow rate, a measured HF fluid pressure, and sensor data from a fiber optic sensing system. Element 9: wherein the predicting the distribution result is utilized to modify a plan of the treatment stage. Element 10: wherein the treatment stage is a first treatment stage and the predicting the distribution result is utilized to modify a plan of a second treatment stage employed after the first treatment stage. Element 11: wherein the calibrating utilizes a non-linear optimization technique, and the predicting utilizes a non-linear solution of a system of equations. Element 12: a well site controller, operable to direct a treatment stage at the well site using the distribution result. Element 13: the fluid sensor is at least one surface fluid sensor. Element 14: a pumping plan generator, operable to modify a pumping plan of the treatment stage using the distribution result, and communicate with the well site controller. Element 15: wherein the directing the treatment stage utilizes one or more of a downhole HF fluid flow rate, a concentration of a proppant, a concentration of a chemical, a concentration of a solid, and a diverter schedule. Element 16: wherein the fluid sensor is at least one downhole sensor located in a wellbore. Element 17: wherein the downhole sensor utilizes a point and distributed fiber optic sensing system. Element 18: wherein the downhole material predictor is further operable to analyze two or more distribution results, select a best fit distribution result, and communicate the best fit distribution result. Element 19: recommending a pumping plan of the treatment stage utilizing the distribution result. Element 20: wherein the recommending includes one or more of continuing with the pumping plan, changing a HF fluid flow rate, changing a concentration of a proppant, changing a concentration of a chemical, changing a concentration of a solid, and changing a diverter schedule. Element 21: wherein the operations are executed in real-time or near real-time to a collecting of calibration parameters from the well site, wherein the calibration parameters are utilized in the calibrating.

What is claimed is:

1. A method to determine a distribution of a downhole material for a treatment stage of a hydraulic fracturing (HF) well site, comprising:
    determining a predictive model of the distribution of the downhole material for the treatment stage of the HF well site;
    calibrating values of unknown parameters of the predictive model;
    predicting a distribution result of the downhole material for active perforation clusters in a fluid pipe in a wellbore at the HF well site; and
    modifying the treatment stage based on the predicted distribution result, wherein at least a profile of diverter material is adjusted in real-time or near real-time based on the predicted distribution result.

2. The method as recited in claim 1, further comprising:
    modifying a pumping plan of the treatment stage utilizing the distribution result, wherein the modifying includes one or more of continuing with the pumping plan, changing a HF fluid flow rate, changing a concentration of a proppant, changing a concentration of a chemical, changing a concentration of a solid, and changing a diverter schedule.

3. The method as recited in claim 1, further comprising:
    repeating the calibrating and predicting steps at least one time during an execution of the treatment stage.

4. The method as recited in claim 1, wherein the predictive model is a physical model that includes one or more of HF fluid pressure parameters for at least one of the active perforation clusters, fracture cluster HF fluid flow rate, subterranean formation properties, properties of all pumped materials including the downhole material, and completion properties of the HF well site.

5. The method as recited in claim 1, wherein the downhole material is one or more of slurrys, oil-based fluids, water-based fluids, proppants, chemicals, solids, and diverter material.

6. The method as recited in claim 1, further comprising:
    identifying the unknown parameters utilizing user input.

7. The method as recited in claim 6, wherein the values of the unknown parameters are calibrated for each active perforation cluster utilizing one or more of a measured HF fluid flow rate, a calculated HF fluid flow rate, a measured HF fluid pressure, and sensor data from a fiber optic sensing system.

8. The method as recited in claim 6, wherein the predicting the distribution result is utilized to modify a plan of the treatment stage.

9. The method as recited in claim 6, wherein the treatment stage is a first treatment stage and the predicting the distribution result is utilized to modify a plan of a second treatment stage employed after the first treatment stage.

10. The method as recited in claim 1, wherein the calibrating utilizes a non-linear optimization technique, and the predicting utilizes a non-linear solution of a system of equations.

11. A system to determine a distribution of a downhole material for a treatment stage of a hydraulic fracturing (HF) well site, comprising:
    a fluid sensor, located at the HF well site, and operable to collect one or more of a surface HF fluid pressure parameter, a surface proppant concentration parameter, and a surface HF fluid flow rate parameter; and at least one processor configured to:
- determine a predictive model of the distribution of the downhole material for the treatment stage of the HF well site using received predictive model parameters,
- modify the predictive model using parameters received from the fluid sensor,
- calibrate values of unknown parameters of the predictive model using a calibration process on a part or whole of a current or previous pumping stage,
- predict a distribution result of the downhole material for one or more active perforation clusters in a fluid pipe in a wellbore at the HF well site; and
- modify the treatment stage based on the predicted distribution result, wherein at least a profile of diverter material is adjusted in real-time or near real-time based on the predicted distribution result.

12. The system as recited in claim 11, further comprising:
a well site controller embodied in at least one digital data processor, operable to direct a treatment stage at the HF well site using the distribution result, and wherein the fluid sensor is at least one surface fluid sensor.

13. The system as recited in claim 12, wherein the at least one processor is configured to modify a pumping plan of the treatment stage using the distribution result.

14. The system as recited in claim 12, wherein the directing the treatment stage utilizes one or more of a downhole HF fluid flow rate, a concentration of a proppant, a concentration of a chemical, a concentration of a solid, and a diverter schedule.

15. The system as recited in claim 11, wherein the fluid sensor includes at least one downhole sensor located in a wellbore, and the downhole sensor utilizes a point and distributed fiber optic sensing system.

16. The system as recited in claim 11, wherein the at least one processor is further configured to analyze two or more distribution results, select a best fit distribution result, and communicate the best fit distribution result.

17. A computer program product having a series of operating instructions stored on a non-transitory computer-readable medium that directs a data processing apparatus when executed thereby to perform operations to determine a distribution of a downhole material for a treatment stage of a hydraulic fracturing (HF) well site, the operations comprising:
- determining a predictive model of the distribution of the downhole material for the treatment stage of the HF well site;
- calibrating values of unknown parameters of the predictive model;
- predicting a distribution result of the downhole material for active perforation clusters in a fluid pipe in a wellbore at the HF well site; and
- modifying the treatment stage based on the predicted distribution result, wherein at least a profile of diverter material is adjusted in real-time or near real-time based on the predicted distribution result.

18. The computer program product as recited in claim 17, further comprising:
recommending a pumping plan of the treatment stage utilizing the distribution result, wherein the recommending includes one or more of continuing with the pumping plan, changing a HF fluid flow rate, changing a concentration of a proppant, changing a concentration of a chemical, changing a concentration of a solid, and changing a diverter schedule.

19. The computer program product as recited in claim 17, wherein the operations are executed in real-time or near real-time to a collecting of calibration parameters from the HF well site, wherein the calibration parameters are utilized in the calibrating.

20. The computer program product as recited in claim 17, wherein the calibrating utilizes a non-linear optimization technique, and the predicting utilizes a non-linear solution of a system of equations.

* * * * *